(12) United States Patent
Morley et al.

(10) Patent No.: US 9,803,444 B2
(45) Date of Patent: Oct. 31, 2017

(54) OBTAINING DATA FROM AN UNDERWATER COMPONENT

(75) Inventors: Graham Thomas Morley, Port Talbot (GB); Steven Lewis Simpson, Bristol (GB)

(73) Assignee: GE Oil & Gas UK Limited, Nailsea (GB)

( * ) Notice: Subject to any disclaimer, the term of this patent is extended or adjusted under 35 U.S.C. 154(b) by 933 days.

(21) Appl. No.: 13/115,921

(22) Filed: May 25, 2011

(65) Prior Publication Data

US 2011/0291854 A1    Dec. 1, 2011

(30) Foreign Application Priority Data

May 25, 2010 (GB) .................................. 1008616.3
Mar. 15, 2011 (EP) .................................. 11158289

(51) Int. Cl.
| | | |
|---|---|---|
| *H04B 13/02* | (2006.01) | |
| *E21B 33/035* | (2006.01) | |
| *E21B 47/12* | (2012.01) | |
| *G06K 19/07* | (2006.01) | |

(52) U.S. Cl.
CPC ........ *E21B 33/0355* (2013.01); *E21B 47/122* (2013.01); *G06K 19/0723* (2013.01)

(58) Field of Classification Search
CPC ...... G06K 19/00; G06K 19/06; G06K 19/067; G06K 19/0672; G06K 19/0677; G06K 19/07; G06K 19/0723; G06K 19/077; G06K 19/0771; G06K 19/07749; E21B 15/00; E21B 33/035; E21B 33/0355; H04B 13/02; G01V 1/38; G01V 1/40; G01V 1/42

USPC .................................. 340/850, 572.1–572.9
See application file for complete search history.

(56) References Cited

U.S. PATENT DOCUMENTS

| | | | | |
|---|---|---|---|---|
| 6,330,758 | B1 * | 12/2001 | Feibelman | ................. 40/299.01 |
| 7,106,198 | B2 * | 9/2006 | Phipps et al. | .............. 340/572.1 |
| 7,176,795 | B2 * | 2/2007 | Roed et al. | ................ 340/568.1 |
| 7,301,474 | B2 * | 11/2007 | Zimmerman | .............. 340/854.6 |
| 7,511,617 | B2 * | 3/2009 | Burman et al. | ............ 340/572.1 |
| 8,159,903 | B2 * | 4/2012 | Skrobanek et al. | .......... 367/134 |
| 8,536,983 | B2 * | 9/2013 | Harasti et al. | ............... 340/10.1 |

(Continued)

FOREIGN PATENT DOCUMENTS

| | | |
|---|---|---|
| CN | 201233759 Y | 5/2009 |
| WO | 2008109929 A1 | 9/2008 |
| WO | 2009122168 A1 | 10/2009 |

OTHER PUBLICATIONS

Search Report & Written Opinion for corresponding GB1008616.3 . dated Jun. 15, 2010.

(Continued)

*Primary Examiner* — Ryan Sherwin
(74) *Attorney, Agent, or Firm* — GE Global Patent Operation

(57) ABSTRACT

A method of obtaining data from a subsea control module of an underwater well facility is provided. The method comprises: providing a tag which stores data relating to the module, the tag being operable to wirelessly transmit the data to a reader device; locating the tag at the module; providing a reader device; and interrogating the tag using the reader device, such that the tag is caused to wirelessly transmit the data to the reader device, wherein the tag is communicatively connected to a subsea electronics module for receiving information therefrom.

20 Claims, 1 Drawing Sheet

(56) References Cited

U.S. PATENT DOCUMENTS

| | | | |
|---|---|---|---|
| 8,692,655 B2* | 4/2014 | Zimman | G06F 21/32 340/10.51 |
| 2006/0279412 A1 | 12/2006 | Holland et al. | |
| 2007/0199715 A1 | 8/2007 | Ayoub et al. | |
| 2007/0257104 A1* | 11/2007 | Owen et al. | 235/380 |
| 2009/0212969 A1* | 8/2009 | Voss | 340/853.1 |
| 2010/0086235 A1 | 4/2010 | Loughrey et al. | |
| 2010/0096455 A1 | 4/2010 | Binmore | |
| 2010/0214080 A1* | 8/2010 | Alexis | G06K 17/00 340/10.51 |
| 2012/0098674 A1* | 4/2012 | Mcstay et al. | 340/850 |

OTHER PUBLICATIONS

Unofficial English Translation of Chinese Office Action issued in connection with corresponding CN Application No. 201110154015.X on Nov. 17, 2014.

European Search Report and Opinion issued in connection with corresponding EP Application No. 11158289.6 on Apr. 25, 2016.

* cited by examiner

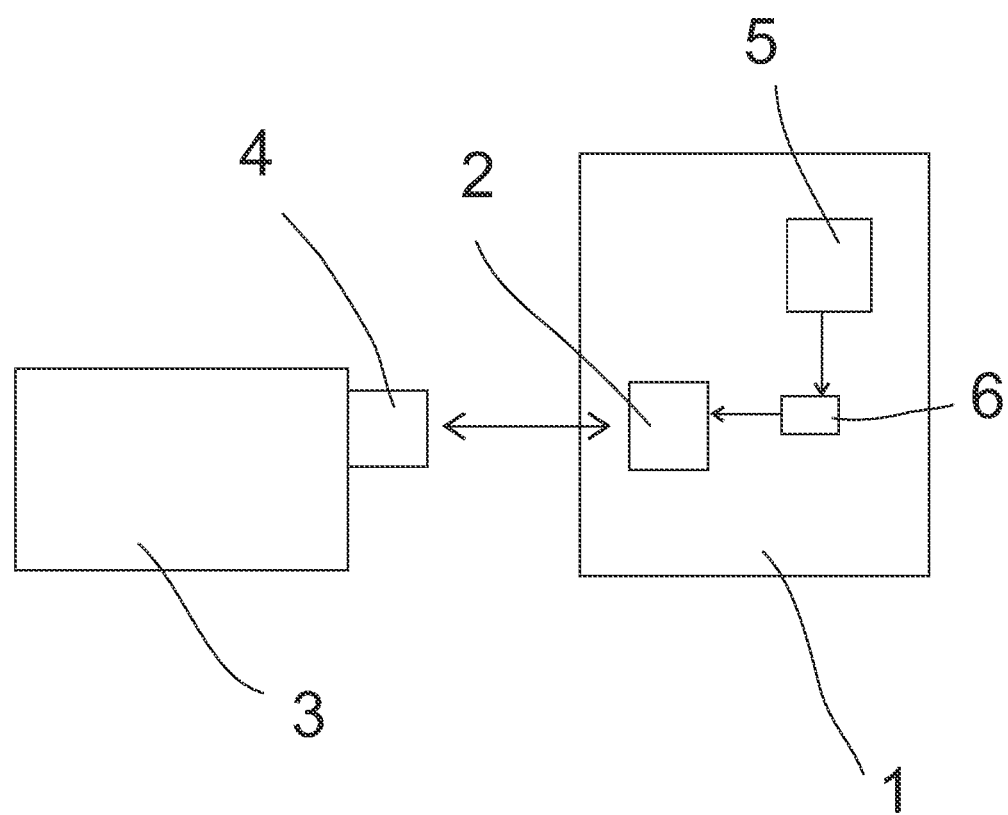

OBTAINING DATA FROM AN UNDERWATER COMPONENT

BACKGROUND OF THE INVENTION

Field of the Invention

Embodiments of the present invention relate to obtaining data from an underwater component, in particular a subsea control module of an underwater well facility.

Description of the Prior Art

Identification of components or the obtaining of other data relating to components of an underwater fluid extraction well facility, for example a subsea hydrocarbon extraction well facility, is typically achieved by reading written or engraved labels fixed on the item, which provide a visual indication of the component data. However, such labelling has problems associated with it. For example, when such items are in storage in a surface location, it is often difficult to locate the label, particularly if the item is inside a protected package. Furthermore, when the item is deployed underwater it may be difficult to read such labels in a typically poor visibility environment. This reading may typically be attempted by a remotely operated vehicle (ROV) equipped with a camera, or a diver.

An example of such an item which requires labelling is a subsea control module (SCM). In the event of a power failure at the complex for example, it may be necessary to obtain information relating to an unpowered module in order to identify all internal components, in order to be able to set communications parameters.

Embodiments of the present invention employ a wireless identification tag such as a radio frequency identification (RFID) tag or alternative non-contact, non-battery back-up, tag-type device to contain vital information for the equipment. Such tags may be scanned to identify the item and reveal its detail parameters, regardless of visibility.

RFID is an available technology that permits data to be read from a tag using an interrogator or reader device in a wireless manner using radio frequency communication, so that contact is not required between the tag and the interrogator. Such tags, known as "passive" tags, do not require a battery, since they use some of the radio frequency energy received from the interrogator during interrogation for power, enabling the data to be transmitted to the interrogator. RFID tags typically comprise an integrated circuit for storing and processing the data, modulating and demodulating an RF signal, and an antenna, typically formed as a printed track.

RFID data tags are relatively low cost and they have a low form factor. Reading of the tag data may be achieved by a commercial interrogator/reader that only needs to be in the proximity of the tag in a storage situation and temporarily held in an arm of a ROV for subsea application or by a diver, the data being stored by the reader and retrieved at the surface.

SUMMARY OF THE INVENTION

According to one embodiment of the present invention, there is provided a method of obtaining data relating to a component installed at an underwater well facility, the method comprising providing a tag which stores data relating to the component, the tag being operable to wirelessly transmit the data to a reader device. The method also comprises locating the tag at the component. The method further comprises providing a reader device. The method also comprises interrogating the tag using the reader device, such that the tag is caused to wirelessly transmit the data to the reader device, wherein the component comprises a subsea control module; and wherein the tag is communicatively connected to a subsea electronics module for receiving information therefrom.

According to an additional embodiment there is provided a method of resetting communications parameters within a communications system between the subsea control module and a surface location of the underwater well facility, comprising obtaining data relating to the subsea control module using a method according to embodiments of the invention, and resetting the communications parameters based on the data obtained.

BRIEF DESCRIPTION OF THE DRAWINGS

FIG. 1 is a schematic block diagram for use in describing an embodiment of the invention.

DETAILED DESCRIPTION OF THE INVENTION

Referring to FIG. 1, a subsea control module (SCM) 1 of a subsea hydrocarbon extraction facility is shown, which after installation is located at subsea well tree (not shown) on the seabed. An RFID tag 2 is provided and affixed to the SCM 1. This is a passive tag, and so does not require a battery or other connected power source. The tag stores various data associated with the SCM 1, as described further below. These data may for example be programmed on to the tag 2 by means of an RFID programmer (not shown) while at the surface. In this embodiment, the SCM 1 is also provided with an identification label, providing a visual indication of the same or similar data, located on the surface of SCM 1. The label is similar to that used currently, having a typical size of 8 cm×8 cm. The tag 2 is similarly sized, and is located behind the label. This means that, during interrogation (see below), if one form of identification fails, the other may be used as a back-up, i.e. if the RFID tag 2 fails, then data may still be read from the label. Furthermore, since tag 2 is positioned behind the label, it may be easily found.

The tag 2 may be read by a reader device 4, which as shown is carried by an arm of a remotely operated vehicle (ROV) 3. In use, the ROV 3 is used to manoeuvre the reader device 4 sufficiently close to the tag 2 to enable data transmission from the tag 2 to the reader device 4. As is known in the art, once the reader device 4 and tag 2 are sufficiently close, radio frequency energy from the reader device 4 activates the tag 2 and causes it to wirelessly transmit data to the reader device 4. The reader device 4 may be configured to ask for all data, or set to collect certain items of data. The collected data is stored by the reader device 4 and retrieved therefrom when it is returned to the surface.

Typical information that would be stored by the RFID tag for an SCM, includes: serial number; electronic equipment addresses; software revisions; part number; date of manufacture and/or installation; and service interval and/or information.

A subsea electronics module (SEM) 5 is located within or proximate to the SCM 1, the SEM 5 comprising processing means essential for the functioning of the well, and being in communicative contact with the surface location as is known in the art. In the embodiment shown in FIG. 1, the SEM 5 is communicatively connected, either via hardwires or wireless means (e.g. using RF connectivity), to an RFID programmer 6. Programmer 6 is located in a suitable position proximate to tag 2 in order to allow reprogramming of tag 2. In this way, the SEM 5 is able to control reprogramming of the tag 2 in-situ, i.e. whilst deployed subsea. This SEM—tag connection is also used to record any changes to the SCM software configuration, such as SEM addresses, configuration file checksums, etc. In addition, the SEM 5 may update the tag 2 with other operational data of the facility which may be of interest when the SCM 1 is eventually retrieved from the subsea location. Such information may include a number of valve operations performed, the time spent subsea, etc.

In the case of the SCM, the data provided by the RFID tag allows the resetting of communications parameters, even if the device had stopped working, or if there was a potential conflict of communications parameters with other SCMs. In this case the cost of having to retrieve the device may be avoided.

The above-described embodiment is exemplary only, and other possibilities and alternatives within the scope of the invention will be apparent to those skilled in the art. For example, although an ROV has been shown as being used to manoeuvre the reader device into proximity with the tag, a diver may be used instead. In addition, the tagging of components enables identification, and the obtaining of other data, when the SCM 1 is at a surface location, for example in storage.

While embodiments of the present invention has been described with particular reference to an RFID-type tag, other technologies may be used which enable wireless data transfer.

The tags described above are passive, requiring no battery or other power source. However, it is possible to use powered devices. In this case, power may be obtained from, for example, batteries, the well tree power supply, or subsea-located power generation means such as turbines.

What is claimed is:

1. A method of obtaining data relating to a component installed at an underwater well facility, the method comprising:
   providing a tag which stores data relating to the component, the tag being operable to wirelessly transmit the data to a reader device;
   locating the tag at the component;
   providing the reader device;
   interrogating the tag using the reader device, such that the tag is caused to wirelessly transmit the data to the reader device, wherein:
   the component comprises a subsea control module; and
   the tag is communicatively connected to a subsea electronics module and is located within and/or proximate the subsea electronics module, wherein the subsea electronics module comprises a processor for a functioning of the underwater well facility and wherein the tag receives information from the subsea electronics module to control a reprogramming of the tag, wherein the reprogramming comprises changing the data stored in the tag in response to changes to data associated with the component due to the functioning of the underwater well facility; and
   resetting communications parameters within a communications system between the subsea control module and a surface location of the underwater well facility based on the data obtained from the tag.

2. The method of claim 1, wherein the information comprises information relating to the subsea control module software configuration.

3. The method of claim 1, wherein interrogating the tag using the reader device comprises using a remotely operated vehicle to maneuver the reader device sufficiently close to the tag to enable the data transmission.

4. The method of claim 1, wherein interrogating the tag using the reader device comprises using a diver to maneuver the reader device sufficiently close to the tag to enable the data transmission.

5. The method of claim 1, wherein the tag comprises a radio frequency identification (RFID) tag.

6. The method of claim 1, wherein the information comprises operational data of the underwater well facility.

7. The method according to claim 1, wherein the subsea control module is further provided with an identification label providing a visual representation of the data.

8. The method according to claim 1, wherein the identification label is located on a surface of the subsea control module, and the tag is located behind the identification label.

9. The method according to claim 1, wherein the information comprises identification data of the subsea control module.

10. The method according to claim 1, wherein the information comprises at least one of: information for reprogramming the tag; information relating to the subsea control module software configuration; operational data of the underwater well facility; and identification data of the subsea control module.

11. The method according to claim 1, wherein the reprogramming of the tag is executed by an RFID programmer that is located proximate to the tag, the RFID programmer being a separate entity than the subsea electronics module and is communicatively connected to the subsea electronics module.

12. The method according to claim 11, wherein the reprogramming of the tag is executed by the subsea electronics module, while deployed subsea, through the RFID programmer.

13. A method of resetting communications parameters within a communications system between a subsea control module and a surface location of an underwater well facility, comprising:
   providing a tag which stores data relating to the subsea control module, the tag being operable to wirelessly transmit the data to a reader device;
   locating the tag within or proximate a subsea electronics module, wherein the subsea electronics module comprises a processor for a functioning of the underwater well facility and wherein the tag receives information from the subsea electronics module to control a reprogramming of the tag,
   wherein the reprogramming comprises changing the data stored in the tag in response to changes to data associated with the subsea control module due to the functioning of the underwater well facility;
   providing a reader device;
   interrogating the tag using the reader device, such that the tag is caused to wirelessly transmit the data to the reader device, the tag being communicatively connected to the subsea electronics module for receiving information therefrom; and
   resetting the communications parameters between the subsea control module and the surface location of the underwater well facility based on the data obtained from the tag.

14. The method of claim 13, wherein interrogating the tag using the reader device comprises using a remotely operated vehicle to maneuver the reader device sufficiently close to the tag to enable the data transmission.

15. The method of claim 13, wherein interrogating the tag using the reader device comprises using a diver to maneuver the reader device sufficiently close to the tag to enable the data transmission.

16. The method of claim 13, wherein the tag is passive.

17. The method of claim 13, wherein the tag comprises a radio frequency identification (RFID) tag.

18. The method of claim 13, wherein the subsea control module is further provided with an identification label providing a visual representation of the data.

19. The method of claim 13, wherein the identification label is located on a surface of the subsea control module, and the tag is located behind the identification label.

20. The method of claim 13, wherein the information comprises identification data of the subsea control module.

\* \* \* \* \*